(12) United States Patent
Esaki

(10) Patent No.: US 11,892,087 B2
(45) Date of Patent: Feb. 6, 2024

(54) ROTARY VALVE

(71) Applicant: AISIN CORPORATION, Aichi (JP)

(72) Inventor: Yasuhiko Esaki, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 17/943,876

(22) Filed: Sep. 13, 2022

(65) Prior Publication Data

US 2023/0085406 A1 Mar. 16, 2023

(30) Foreign Application Priority Data

Sep. 15, 2021 (JP) ................................ 2021-150239

(51) Int. Cl.
*F16K 11/085* (2006.01)
*F16K 5/04* (2006.01)
*F16K 27/06* (2006.01)

(52) U.S. Cl.
CPC ........ *F16K 11/0853* (2013.01); *F16K 5/0407* (2013.01); *F16K 27/065* (2013.01)

(58) Field of Classification Search
CPC ... F16K 11/0853; F16K 11/056; F16K 11/085
See application file for complete search history.

(56) References Cited

U.S. PATENT DOCUMENTS

| | | |
|---|---|---|
| 783,312 A | 2/1905 | Rife |
| 1,556,804 A | 10/1925 | Parks et al. |
| 10,344,877 B2 * | 7/2019 | Roche .................... B60L 58/26 |
| 2017/0152957 A1 | 6/2017 | Roche et al. |
| 2018/0292016 A1 * | 10/2018 | Ledvora ................ F16K 5/0471 |
| 2021/0381607 A1 * | 12/2021 | Koch .................... F16K 11/076 |

FOREIGN PATENT DOCUMENTS

| | | |
|---|---|---|
| GB | 270 997 A | 5/1927 |
| JP | H0622672 U | 3/1994 |
| JP | 2018536128 A | 12/2018 |

OTHER PUBLICATIONS

The extended European Search Report dated Feb. 6, 2023, by the European Patent Office in corresponding European Patent Application No. 22189909.9-1015. (7 pages).

* cited by examiner

*Primary Examiner* — Michael R Reid
(74) *Attorney, Agent, or Firm* — BUCHANAN INGERSOLL & ROONEY PC

(57) ABSTRACT

A rotary valve includes: a valve chamber in which at least three ports including at least a first port, a second port, and a third port are disposed in a circumferential direction; at least three external flow paths communicating with the three ports, respectively; and a valve rotor accommodated in the valve chamber so as to be rotatable and configured to switch a flow of a fluid between the ports by a rotation operation. The first port extends in the circumferential direction of a wall portion of the valve chamber. A first buffer portion is formed between the first port and the external flow path corresponding to the first port. The first buffer portion covers the entire first port and serves as a space having a circumferential width larger than a circumferential width of a valve flow path.

6 Claims, 8 Drawing Sheets

ROTARY VALVE

CROSS REFERENCE TO RELATED APPLICATIONS

This application is based on and claims priority under 35 U.S.C. § 119 to Japanese Patent Application 2021-150239, filed on Sep. 15, 2021, the entire content of which is incorporated herein by reference.

TECHNICAL FIELD

This disclosure relates to a rotary valve.

BACKGROUND DISCUSSION

As a rotary valve, JP-UM-A-6-022672 (Reference 1) discloses a five-port four-position switching valve including a valve box in which five valve chambers communicating with five ports are formed, and a valve body disposed to overlap the valve box, in which a plurality of communication passages formed in the valve body are connected to the valve chambers by rotating the valve body, and a flow of a fluid in the ports is controlled.

JP 2018-536128T (Reference 2) discloses a rotary valve in which a stem shell is rotatably accommodated in a valve housing having five ports, and a predetermined one of the five ports is selectively coupled by rotation of the stem shell to allow a fluid to flow between the coupled ports.

Reference 1 has a configuration in which the valve box and the valve body are overlapped each other so as to be rotatable relative to each other about a rotation axis, the five valve chambers of the valve box are opened to a boundary between the valve box and the valve body, and a fixed-side valve seat is formed at a portion where the valve chamber is opened. Four openings of the valve body are opened to the boundary between the valve box and the valve body at intervals of 90° around the rotation axis, and a movable-side valve seat is formed at the opened portion. In the switching valve, two adjacent openings are connected by a first communication passage, and the remaining two openings are connected by a second communication passage.

Accordingly, when the valve body is operated to rotate, it is possible to control the flow of the fluid between two sets of two ports out of the five ports.

Reference 2 discloses the rotary valve (in Reference 2, a multi-port and multi-mode valve) in which five tubular ports are formed in a cylindrical valve housing in a radial posture around a rotation axis of the stem shell, and the stem shell includes two channels that determine the flow of the fluid.

In Reference 2, the stem shell is rotated based on a mode in which the fluid flows from a port A to a port C as shown in FIG. 8 in the Reference, and switching to a mode in which the fluid from a port B flows to the port C as shown in FIG. 9 in the Reference is enabled.

In order to implement such switching, in the rotary valve in Reference 2, an opening area of the port C corresponding to an end portion of a flow path of the stem shell is sufficiently increased, and an opening area of a portion where the port A and the port B face the stem shell is made smaller than that of the port C. However, in the configuration in which the opening area of the port is small, flow path resistance is increased, which leads to reduction of the flow of the fluid.

As disclosed in Reference 2, when the flow of the fluid in each port is controlled by the stem shell accommodated in the valve housing, a posture of the flow paths connected to the valve housing is set radially with respect to a center of the valve housing as described in FIGS. 8 to 13 and the like in Reference 2, so that an increase in the flow path resistance at a boundary portion between the ports and a valve rotor is prevented.

However, in consideration of a structure of a device provided with the rotary valve and a space in which the flow paths is to be disposed, as shown in Reference 2, it is often difficult to form a posture of the flow paths connected to the valve housing radially. For example, it can be imagined as a configuration in which the flow paths are connected to an outer surface of the valve housing at an angle close to a tangent line. When the flow paths are connected at such an angle, there is a concern that the flow path resistance at the boundary between the ports and the valve rotor (stem shell in Reference 2) is increased.

A need thus exists for a rotary valve which is not susceptible to the drawback mentioned above.

SUMMARY

A characteristic configuration according to this disclosure includes: a valve chamber in which at least three ports including at least a first port, a second port, and a third port are disposed in this order as openings arranged in a circumferential direction in a cylindrical wall portion centered on a rotation axis; at least three external flow paths disposed outside the valve chamber and communicating with the at least three ports including the first port, the second port, and the third port, respectively; and a valve rotor accommodated in the valve chamber so as to be rotatable about the rotation axis and configured to switch a flow of a fluid between the plurality of ports by a rotation operation. The valve rotor includes a valve flow path that allows the fluid to flow between the first port and the second port in a state in which the valve rotor is set to a first rotation position, and the first port extends in the circumferential direction of the wall portion in accordance with a predetermined angle in order to allow the fluid to flow between the first port and the third port via the valve flow path in a state in which the valve rotor is set to a second rotation position in which the valve rotor is rotated by the predetermined angle from the first rotation position, and a first buffer portion is formed between the first port and the external flow path corresponding to the first port, the first buffer portion covering the entire first port and serving as a space having a circumferential width larger than a circumferential width of the valve flow path.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to drawings.

[Basic Configuration]

As shown in FIGS. 1 to 3 and 6, a rotary valve V is implemented by forming a cylindrical wall portion 3 around a rotation axis X with respect to a valve chamber 2 of a valve housing 1, accommodating a valve rotor R inside the wall portion 3 so as to be rotatable around the rotation axis X, forming a plurality of ports P as openings in the wall portion 3 of the valve chamber 2, providing external flow paths L individually communicating with the plurality of ports P, and providing an electric actuator 6 for rotationally operating the valve rotor R.

Figure 5:
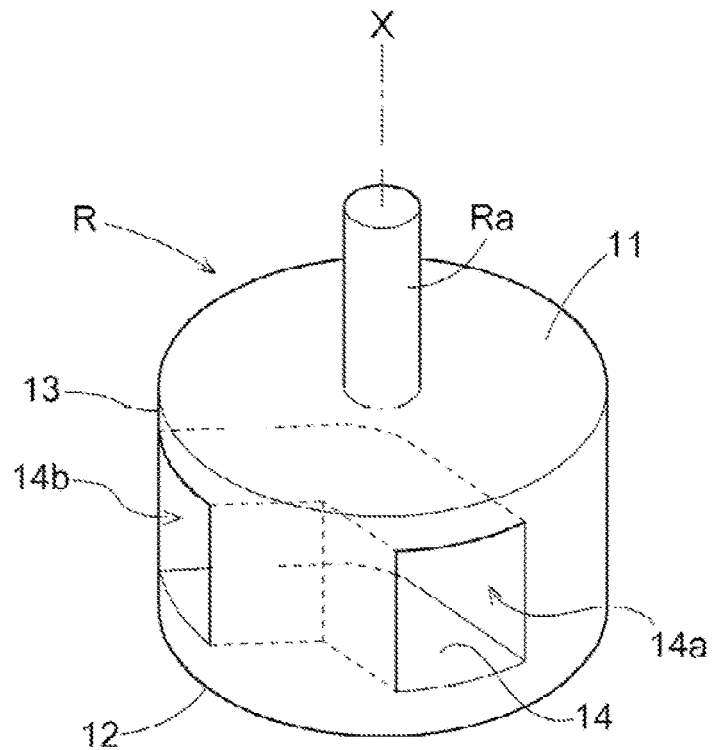
FIG. 5 is a perspective view of the valve rotor.
Figure 6:
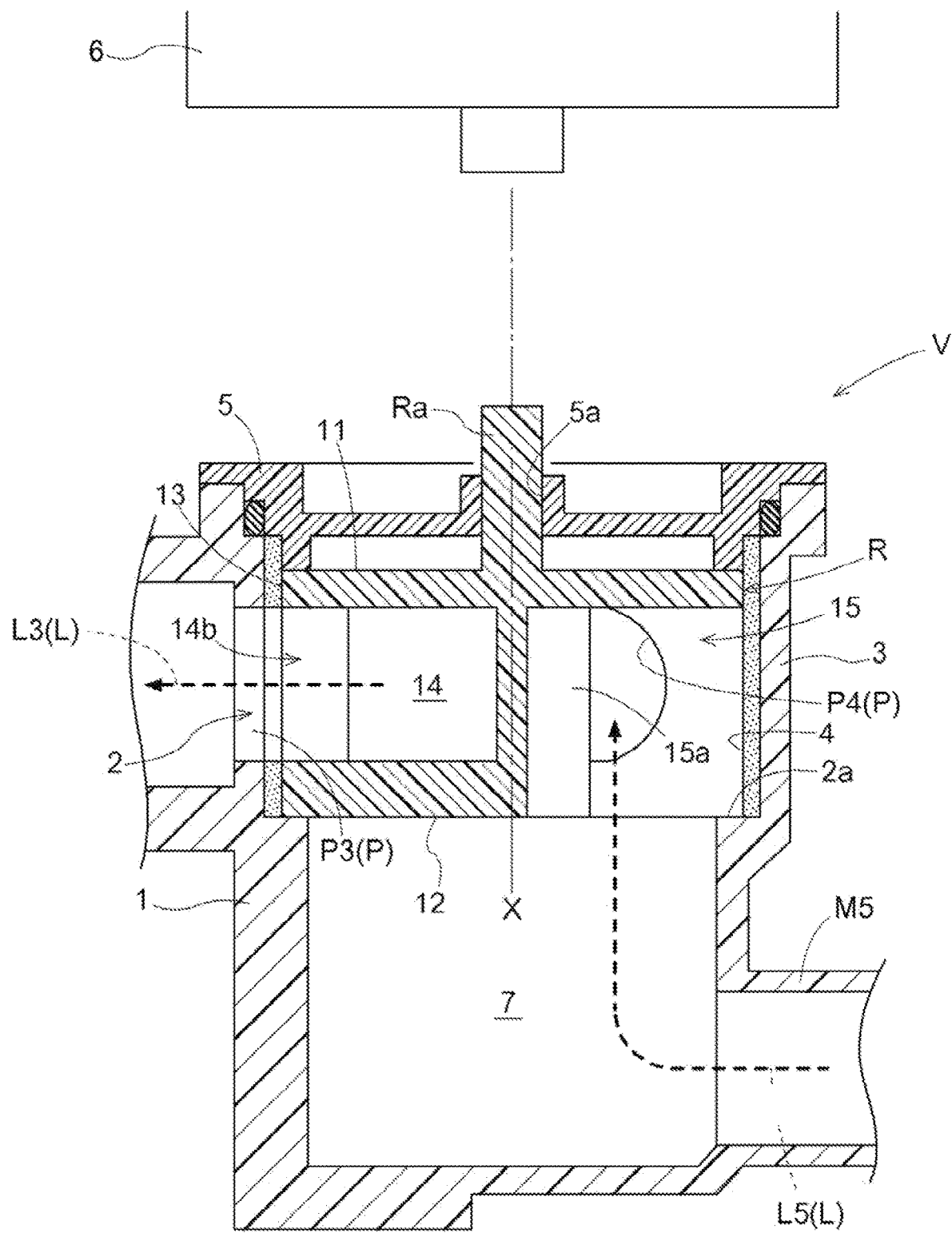
FIG. 6 is a cross-sectional view taken along VI-VI line in FIG. 3.

As shown in FIG. 6, the rotary valve V includes a tubular seal member 4 on an inner periphery of the wall portion 3 of the valve chamber 2, the valve rotor R is accommodated on an inner peripheral side of the seal member 4, and an open portion of the valve chamber 2 is closed by a plate-shaped lid body 5. A drive shaft Ra (see FIGS. 4 and 5) formed in the valve rotor R is disposed in a state of being inserted into a through hole 5a of the lid body 5, and an output shaft of the electric actuator 6 is connected to the drive shaft Ra. The drive shaft Ra may be formed as a separate component from the valve rotor R and may be implemented to be attached to the valve rotor R.

In the rotary valve V, the valve housing 1, the lid body 5, and the valve rotor R are formed of a resin material, and the seal member 4 is formed of rubber, a resin material that can be flexibly deformed, or the like so as to prevent leakage of a fluid between an outer periphery of the valve rotor R and the inner periphery of the wall portion 3.

The rotary valve V is used to control a flow of a fluid such as a coolant or cooling water in a vehicle such as an automobile, for example, and implements a control of sending out the fluid from a supply source side among the plurality of external flow paths L to a supply target side among the plurality of external flow paths L by a rotation operation of the valve rotor R.

Figure 2:
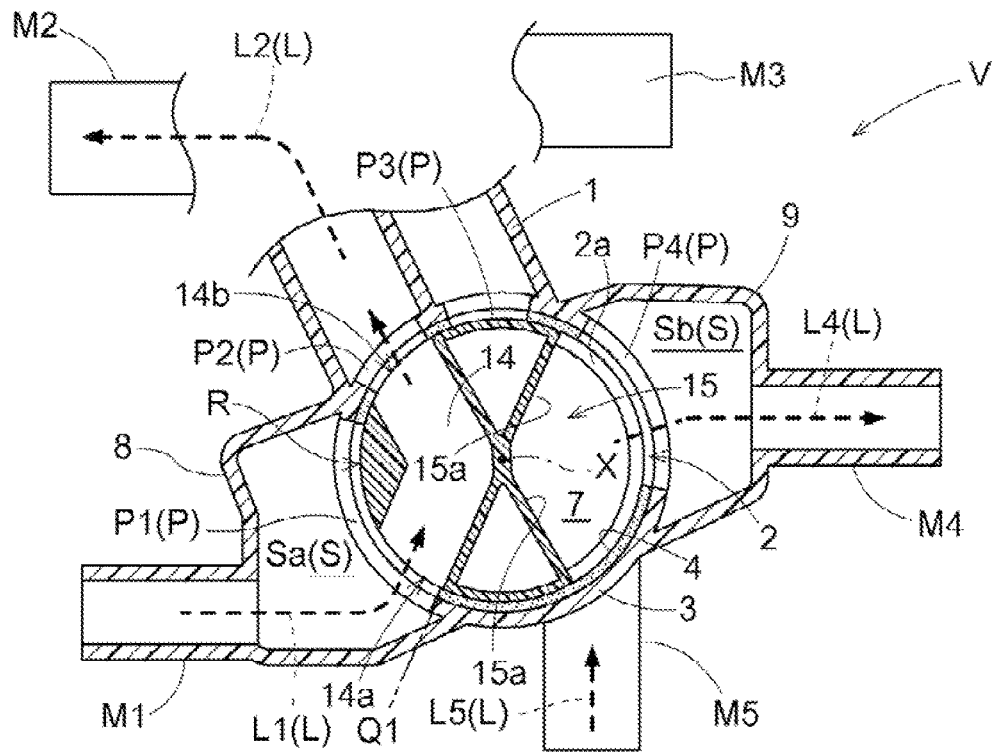
FIG. 2 is a cross-sectional view of a valve housing in which a first port and a second port communicate with each other.
Figure 3:
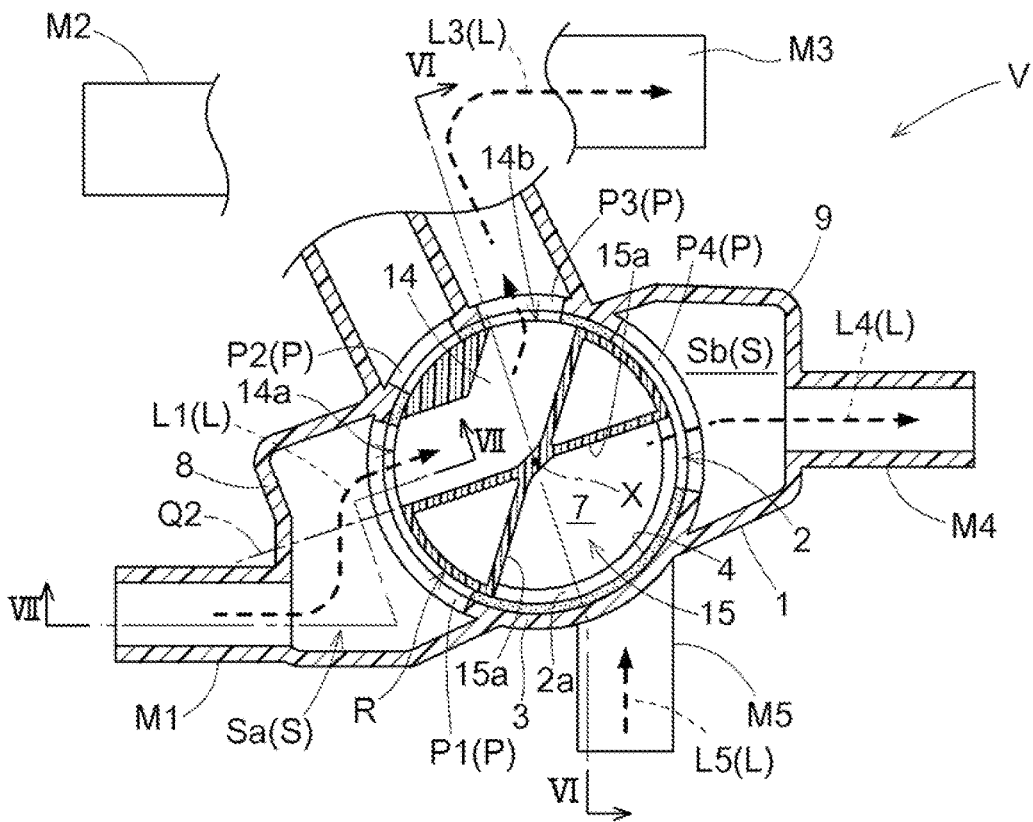
FIG. 3 is a cross-sectional view of the valve housing in which the first port and a third port communicate with each other.

As shown in FIGS. 2 and 3, the port P is a generic term for a first port P1, a second port P2, a third port P3, and a fourth port P4. The external flow path L is a generic term for a first external flow path L1, a second external flow path L2, a third external flow path L3, a fourth external flow path L4, and a fifth external flow path L5.

Figure 4:
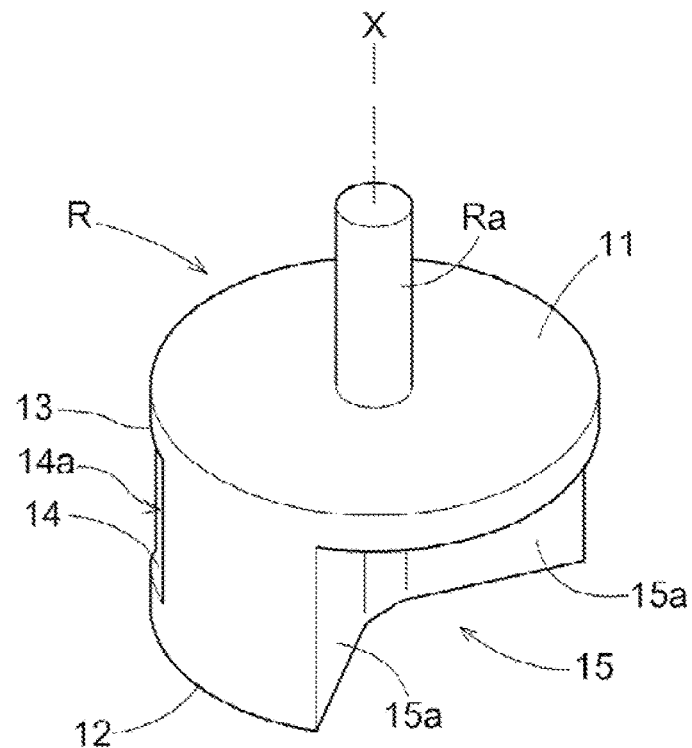
FIG. 4 is a perspective view of a valve rotor.

Although the rotary valve V can be used in any posture, an up-down relationship will be described based on the fact that the rotation axis X is in a vertical posture as shown in FIG. 6. The rotation axis X indicates a center position of the cylindrical wall portion 3, and is also used to indicate a rotation center of the valve rotor R as shown in FIGS. 2 to 4.

[Valve Housing/Valve Chamber]

As shown in FIGS. 2, 3, and 6, the valve chamber 2 is formed as a columnar space inside the wall portion 3 around the rotation axis X, and the valve rotor R is rotatably accommodated in the valve chamber 2. As shown in FIG. 6, a communication space 7 having a smaller diameter than the valve chamber 2 is formed below the valve chamber 2. In the present embodiment, an annular bottom wall 2a having a slightly smaller diameter than the outer periphery of the valve rotor R and having the rotation axis X as the center is formed at a boundary between a lower end of the valve chamber 2 and an upper end of the communication space 7.

Therefore, when the valve rotor R is accommodated in the valve chamber 2 and the opening at an upper portion of the valve chamber 2 is closed by the lid body 5, an outer peripheral portion of the lower end of the valve rotor R comes into contact with the annular bottom wall 2a of the valve chamber 2, and an upper surface of the valve rotor R comes into contact with a lower surface of the lid body 5, so that a position of the valve rotor R in an up-down direction is determined.

In the wall portion 3 of the valve chamber 2, the first port P1, the second port P2, the third port P3, and the fourth port P4 are formed side by side in a circumferential direction in this order as openings penetrating in a thickness direction (radial direction) of the wall portion 3. The seal member 4 has openings corresponding to the first port P1, the second port P2, the third port P3, and the fourth port P4 and having the same shapes as those of the ports.

Figure 1:
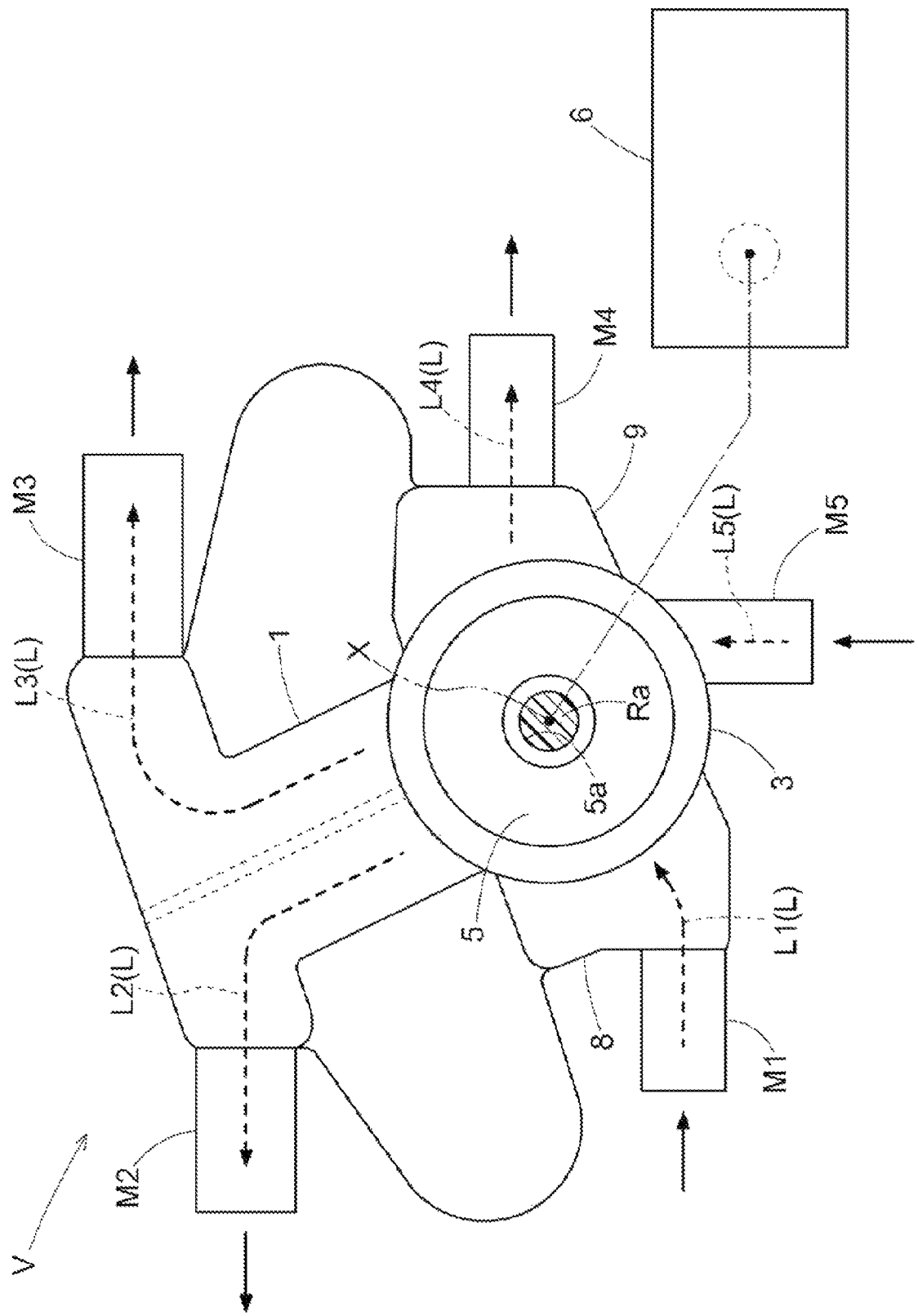
FIG. 1 is a plan view of a rotary valve.

As shown in FIGS. 1 to 3, the valve housing 1 is formed with a first conduit portion M1, a second conduit portion M2, a third conduit portion M3, and a fourth conduit portion M4. As shown in FIG. 6, the valve housing 1 is formed with a fifth conduit portion M5 communicating with the communication space 7.

The first conduit portion M1, the second conduit portion M2, the third conduit portion M3, the fourth conduit portion M4, and the fifth conduit portion M5 are formed as connection ports to which a tube or a hose for supplying and discharging a fluid such as a coolant or cooling water to and from a cooling target, a heat radiating portion, or the like of a vehicle is connected. The first conduit portion M1 is an end portion of the first external flow path L1. The second conduit portion M2, the third conduit portion M3, the fourth conduit portion M4, and the fifth conduit portion M5 are end portions of the second external flow path L2, the third external flow path L3, the fourth external flow path L4, and the fifth external flow path L5, respectively. As shown in FIGS. 2 and 3, the rotary valve V is implemented such that the fluid supplied from the first conduit portion M1 flows to the second conduit portion M2 or the third conduit portion M3, and the fluid supplied from the fifth conduit portion M5 flows to the fourth conduit portion M4.

Figure 7:
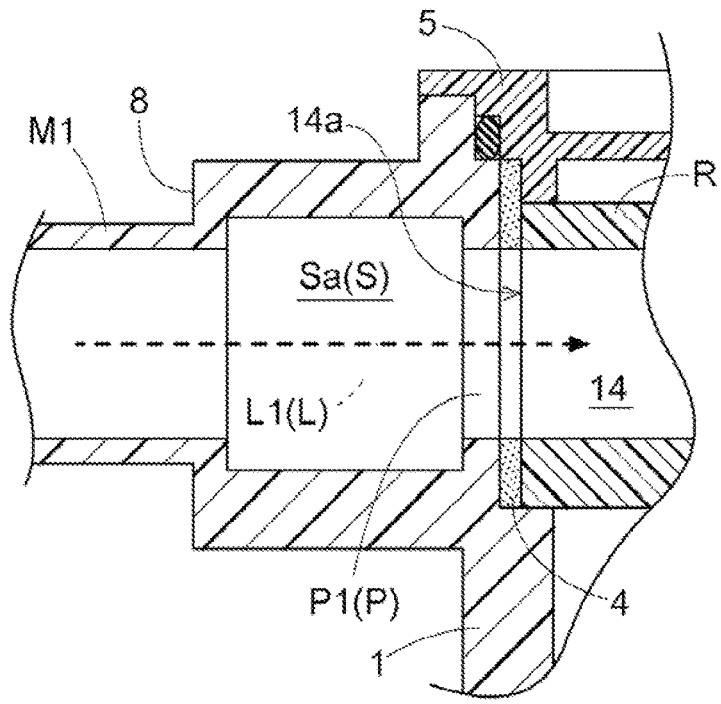
FIG. 7 is a cross-sectional view taken along VII-VII line in FIG. 3.

As shown in FIGS. 2 and 7, the first external flow path L1 is formed in the valve housing 1 to guide the fluid supplied from the first conduit portion M1 to the first port P1 after passing through a first buffer portion Sa (buffer portion S). The valve housing 1 is formed with the fourth external flow path L4 to guide the fluid from the fourth port P4 to the fourth conduit portion M4 via a second buffer portion Sb (buffer portion S). In particular, the first external flow path L1 is formed in a region that reaches the first port P1, via the inside of the first buffer portion Sa, from an internal space of the first conduit portion M1. The first buffer portion Sa (buffer portion S) is formed as a space having a circumferential width larger than a circumferential width of a valve flow path 14.

The first buffer portion Sa, the second buffer portion Sb to be described later, and a third buffer portion Sc to be described later have a common configuration, and are collectively referred to as the buffer portion S.

As shown in FIGS. 1 to 3, the valve housing 1 is formed with the second external flow path L2 for guiding the fluid from the second port P2 to the second conduit portion M2, and the third external flow path L3 for guiding the fluid from the third port P3 to the third conduit portion M3. In particular, a region in the second external flow path L2 that linearly sends the fluid from the second port P2 and a region in the third external flow path L3 that linearly sends the fluid from the third port P3 are formed in a posture parallel to each other. The region in the second external flow path L2 that linearly sends the fluid from the second port P2 and the region in the third external flow path L3 that linearly sends the fluid from the third port P3 are not limited to the parallel posture, and may be formed in a positional relationship in which the regions are arranged to be non-parallel to each other.

The first conduit portion M1, the second conduit portion M2, the third conduit portion M3, the fourth conduit portion M4, the first external flow path L1, the second external flow path L2, the third external flow path L3, the fourth external flow path L4, the first port P1, the second port P2, the third port P3, and the fourth port P4 are disposed at positions overlapping each other on a virtual plane in a posture orthogonal to the rotation axis X. The fifth conduit portion M5 communicating with the communication space 7 is disposed at a position deviated from the above-described virtual plane.

[Valve Rotor/Valve Chamber]

As shown in FIGS. 4 and 5, the valve rotor R has a valve main body 13 in which a disk-shaped upper wall portion 11 and an incomplete circular (partially missing circular) lower wall 12 are integrally formed. In the valve main body 13, the valve flow path 14 having a shape bent at a position in the vicinity of the rotation axis X when viewed in a direction along the rotation axis X is formed inside, and an opening portion 15 (an example of a communication flow path) is formed at a position facing the valve flow path 14 with the rotation axis X interposed therebetween.

The valve flow path 14 is formed in a through hole shape in a region connecting an introduction port 14a on an upstream side and a discharge port 14b on a discharge side, which are formed in a circular outer periphery of the valve main body 13. The opening portion 15 (communication flow path) can allow the fluid in the communication space 7 shown in FIG. 6 to flow from a lower end position of the valve main body 13 to a position reaching the lower surface of the upper wall portion 11, and is implemented by a pair of control surfaces 15a recessed in a direction of the rotation axis X inside the wall portion 3 of the valve chamber 2 in a plan view. That is, the opening portion 15 (communication flow path) is formed at a position where a part of the circular shape of the lower wall 12 is missing.

As shown in FIGS. 2 and 3, the pair of control surfaces 15a are disposed in a positional relationship in which the pair of control surfaces 15a are bent at the position in the vicinity of the rotation axis X at an angle equal to an angle at which the valve flow path 14 is bent when viewed in the direction along the rotation axis X, and the pair of control surfaces 15a control a flow rate of the fluid flowing to the fourth port P4 by setting a rotation position of the valve rotor R.

The valve rotor R rotates about the rotation axis X by a rotational force transmitted from the electric actuator 6 to the drive shaft Ra. In the present embodiment, when the valve rotor R is set to a first rotation position Q1 shown in FIG. 2, the introduction port 14a of the valve flow path 14 is disposed at a position where the introduction port 14a communicates with the first port P1 and the discharge port 14b of the valve flow path 14 communicates with the second port P2, and the flow of the fluid from the first port P1 to the second port P2 is implemented.

Further, even when the valve rotor R is rotated by a predetermined angle from the first rotation position Q1 and is set to a second rotation position Q2 shown in FIG. 3, the discharge port 14b of the valve flow path 14 reaches a position where the discharge port 14b communicates with the third port P3 while the introduction port 14a of the valve flow path 14 is in communication with the first port P1, and the flow of the fluid from the first port P1 to the third port P3 is implemented.

In this way, to maintain a state in which the introduction port 14a of the valve flow path 14 communicates with the first port P1, as shown in FIGS. 2 and 3, the first port P1 is formed as an oval or rectangular opening in a region extending in the circumferential direction of the wall portion 3 of the valve chamber 2.

In particular, in the rotary valve V, regardless of whether the rotary valve V is set to the first rotation position Q1 or the second rotation position Q2, a flow path cross-sectional area of the valve flow path 14 is set to be larger than a flow path cross-sectional area at a boundary between the first port P1 and the valve flow path 14. As a specific structure, since the opening of the first port P1 has an oval shape, a part of the opening of the first port P1 has a circular shape at the first rotation position Q1 and the second rotation position Q2. Since the flow path cross-sectional area of the valve flow path 14 is a rectangle having a larger flow path cross-sectional area than the opening of the first port P1, such a magnitude relationship of the flow path cross-sectional area is created. The flow path cross-sectional area of the valve flow path 14 is implemented to be larger than the flow path cross-sectional area of a boundary between the first buffer portion Sa and the first port P1 regardless of whether the valve rotor R is at the first rotation position Q1 or the second rotation position Q2.

Further, regardless of whether the valve rotor R is at the first rotation position Q1 or the second rotation position Q2, the fourth port P4 is formed as an oval or rectangular opening in a region extending in the circumferential direction of the wall portion 3 of the valve chamber 2, similarly to the first port P1, so as to guide the fluid in the communication space 7 from the fourth port P4 to the fourth external flow path L4.

[First Buffer Portion/Second Buffer Portion]

In the rotary valve V according to the present embodiment, since the first conduit portion M1 is formed in a posture in which the fluid is supplied to a position away from a central portion of the opening of the first port P1, for example, when a configuration in which the first conduit portion M1 is connected to the first port P1 in this posture is imagined, the flow path is bent at a steep angle when the fluid flows from the first conduit portion M1 to the valve flow path 14 via the first port P1, and thus the flow path resistance is increased.

In order to prevent such an increase in the flow path resistance, as shown in FIGS. 2 and 3, the first buffer portion Sa (buffer portion S) is formed as a space having the circumferential width larger than the circumferential width of the valve flow path 14 at a position covering the first port P1 outside the wall portion 3 in which the first port P1 is formed, and protruding outward from the first port P1. The first buffer portion Sa is formed between the wall portion 3 and a supply-side outer wall surface 8 formed at a position separated from the wall portion 3 along an outer surface of the wall portion 3.

Accordingly, the fluid supplied to the first conduit portion M1 is supplied from the internal space of the first conduit portion M1 to the inside of the first buffer portion Sa, and then can flow from the first buffer portion Sa in a posture orthogonal to a wall surface of the wall portion 3 at the portion where the first port P1 is formed (a posture along a radial direction around the rotation axis X), and the flow path resistance at the first port P1 is reduced.

Similarly to the first buffer portion Sa, the second buffer portion Sb (buffer portion S) is formed as a space protruding outward from the fourth port P4 at a position covering the fourth port P4 outside the wall portion 3 outside the fourth port P4. The second buffer portion Sb is formed between the wall portion 3 and a discharge-side outer wall surface 9 formed at a position separated from the wall portion 3. Accordingly, when the fluid is sent out from the fourth port P4, the fluid can flow in a posture orthogonal to the wall surface of the wall portion 3 (a posture along the radial direction around the rotation axis X), inconvenience that the fourth external flow path L4 is bent at a steep angle at the fourth port P4 is eliminated, and the flow path resistance is reduced.

[Control of Fluid]

As shown in FIG. 2, the fluid supplied to the first conduit portion M1 by setting the valve rotor R to the first rotation position Q1 flows through the first conduit portion M1, the first buffer portion Sa, and the first port P1 in this order, flows from the introduction port 14a of the valve rotor R to the valve flow path 14, and flows from the discharge port 14b to the second port P2. The fluid flowing to the second port P2 is sent out from the second conduit portion M2 at a terminal end position of the second external flow path L2.

When the valve rotor R is set to the first rotation position Q1, the fluid supplied to the fifth conduit portion M5 flows from the communication space 7 shown in FIG. 6 to the opening portion 15 of the valve rotor R, flows through the fourth port P4 and the second buffer portion Sb in this order, and is sent out from the fourth conduit portion M4.

As shown in FIG. 3, the fluid supplied to the first conduit portion M1 by setting the valve rotor R to the second rotation position Q2 flows through the first conduit portion M1, the first buffer portion Sa, and the first port P1 in this order, flows from the introduction port 14a of the valve rotor R to the valve flow path 14, and flows from the discharge port 14b to the third port P3. The fluid flowing to the third port P3 is sent out from the third conduit portion M3 at a terminal end position of the third external flow path L3.

When the valve rotor R is set to the second rotation position Q2, the fluid supplied to the fifth conduit portion M5 flows from the communication space 7 shown in FIG. 6 to the opening portion 15 of the valve rotor R, flows through the fourth port P4 and the second buffer portion Sb in this order, and is sent out from the fourth conduit portion M4. That is, regardless of whether the valve rotor R is set to the first rotation position Q1 or the second rotation position Q2, the fluid supplied to the fifth conduit portion M5 is sent out from the fourth conduit portion M4.

[Modification of Arrangement of Fourth Port/Fifth Port]

Figure 8:
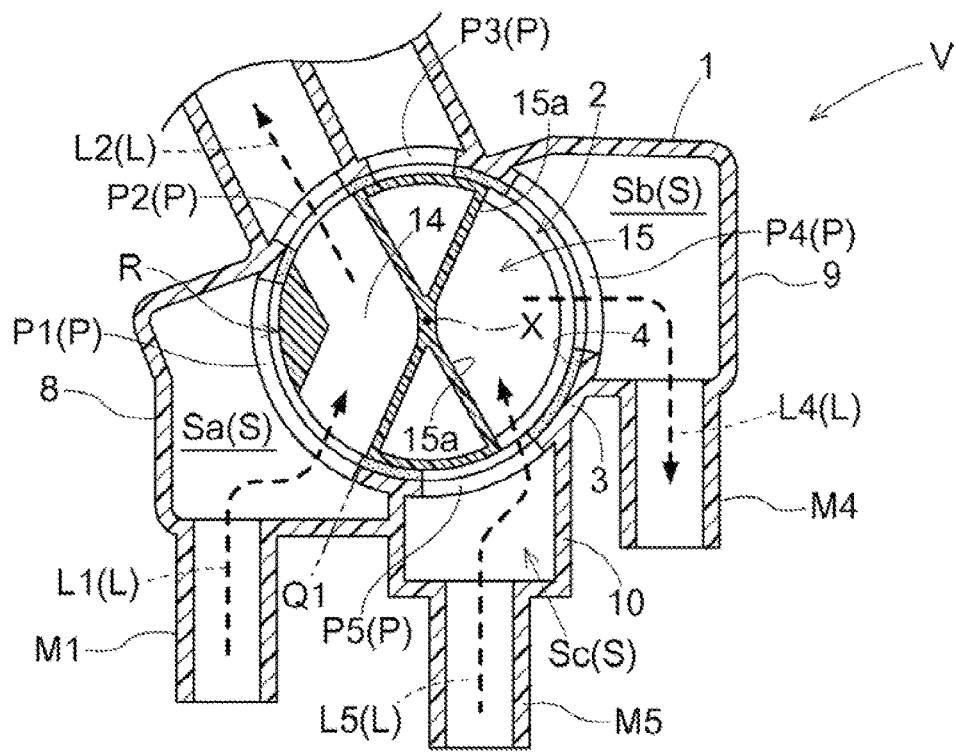
FIG. 8 is a cross-sectional view of a valve housing in which a first port and a second port according to a modification communicate with each other.
Figure 9:
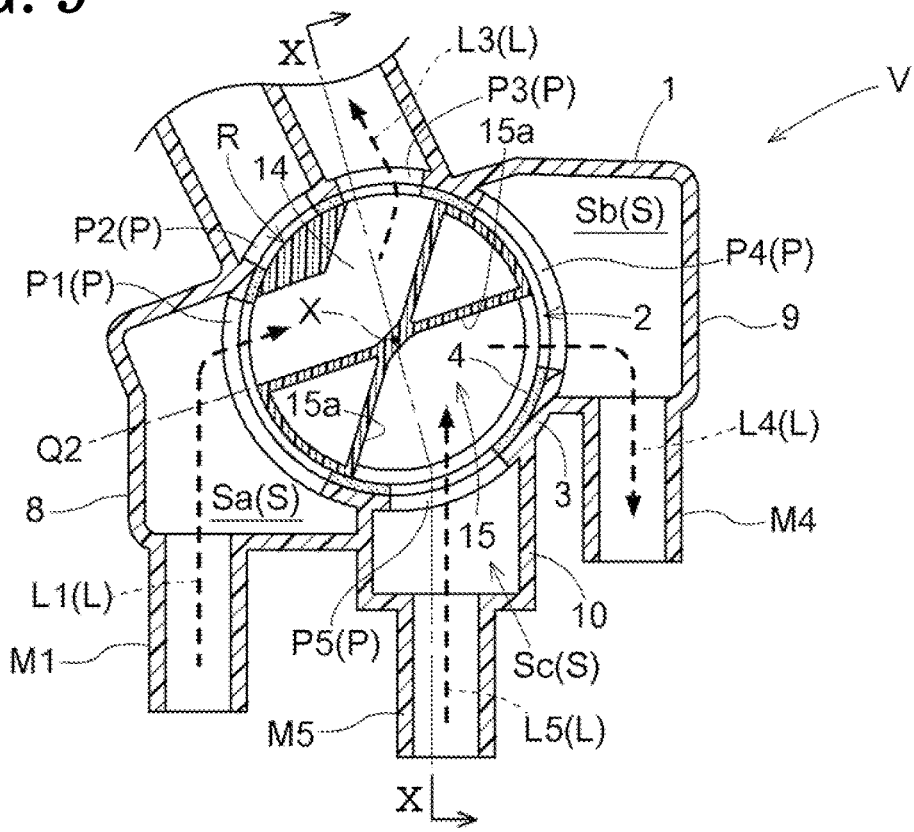
FIG. 9 is a cross-sectional view of the valve housing in which the first port and a third port according to the modification communicate with each other.
Figure 10:
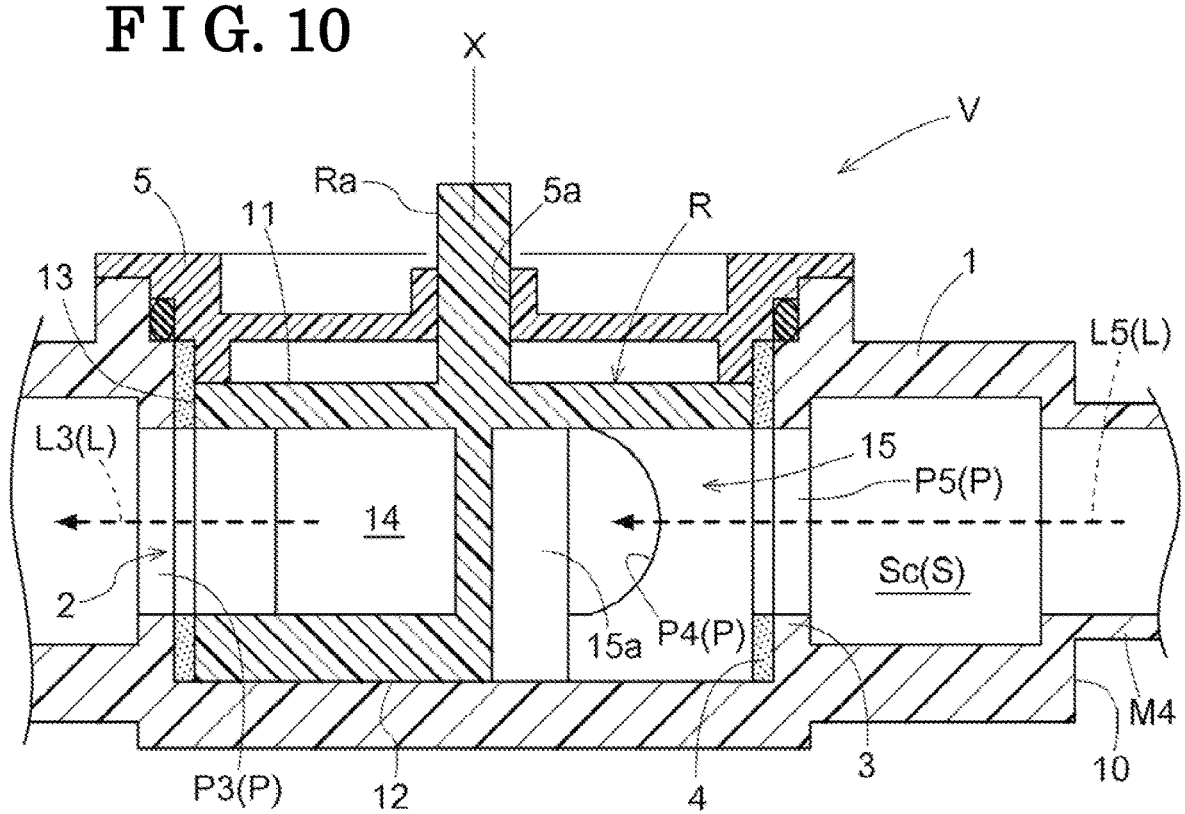
FIG. 10 is a cross-sectional view taken along X-X line in FIG. 9.

As shown in FIGS. 8 to 10, in the direction view along the rotation axis X, a fifth port P5 is formed between the fourth port P4 and the first port P1 in the wall portion 3 of the valve chamber 2, and the third buffer portion Sc is formed outside the fifth port P5.

In the present modification, by setting the valve rotor R to the first rotation position Q1 and the second rotation position Q2, the fluid from the first port P1 is sent out to the second port P2 and the third port P3 by switching therebetween, and the fifth port P5 communicates with the fourth port P4 via the opening portion 15 of the valve rotor R regardless of whether the valve rotor R is set to the first rotation position Q1 or the second rotation position Q2.

That is, similarly to the embodiment, when the valve rotor R is at the first rotation position Q1, the fluid from the first conduit portion M1 at a start end of the first external flow path L1 flows through the first buffer portion Sa, the first port P1, the valve flow path 14 of the valve rotor R, the second port P2, and a terminal end position of the second external flow path L2 in this order, and is sent out from the second conduit portion M2. In the present configuration, as shown in FIG. 10, the rotary valve V is implemented without the communication space 7 shown in the embodiment.

When the valve rotor R is at the second rotation position Q2, the fluid from the first conduit portion M1 at the start end of the first external flow path L1 flows through the first buffer portion Sa, the first port P1, the valve flow path 14, the third port P3, and a terminal end position of the third external flow path L3 in this order, and is sent out from the third conduit portion M3.

Further, regardless of whether the valve rotor R is at the first rotation position Q1 or the second rotation position Q2, the fluid from the fifth conduit portion M5 at a start end of the fifth external flow path L5 flows through the third buffer portion Sc, the fifth port P5, the control surfaces 15a of the opening portion 15, the fourth port P4, and a terminal end position of the fourth external flow path L4 in this order, and is sent out from the fourth conduit portion M4.

In the present modification, similarly to the embodiment, the supply-side outer wall surface 8 is disposed outward of the wall portion 3 to form the first buffer portion Sa that covers the first port P1 and is a space having a circumferential width larger than the circumferential width of the valve flow path 14, and the discharge-side outer wall surface 9 is disposed outward of the wall portion 3 to form the second buffer portion Sb that covers the fourth port P4 and is a space protruding outward from the fourth port.

Further, another communication-side outer wall surface 10 is disposed outward of the wall portion 3 to form the third buffer portion Sc that covers the fifth port P5. As described above, in the modification, as shown in FIG. 10, the fluid from the fifth port P5 is sent to the fourth port P4 by forming a flat bottom wall portion in the valve chamber 2.

In particular, in the present modification, the first conduit portion M1 communicating with the first buffer portion Sa corresponding to the first port P1, the fourth conduit portion M4 communicating with the second buffer portion Sb corresponding to the fourth port P4, and the fifth conduit portion M5 communicating with the third buffer portion Sc corresponding to the fifth port P5 are formed in a posture parallel to one another. The first conduit portion M1, the fourth conduit portion M4, and the fifth conduit portion M5 are not limited to the parallel posture, and may be formed in a positional relationship in which the first conduit portion M1, the fourth conduit portion M4, and the fifth conduit portion M5 are arranged to be non-parallel to one another.

Operation and Effect of Embodiment/Modification

Despite the fact that the rotary valve V has a configuration that enables switching of the flow path by switching the rotation position of the valve rotor R, since the first port P1 is formed as the oval or rectangular opening in a region extending in the circumferential direction of the wall portion 3 of the valve chamber 2 as compared with the second port P2 and the third port P3, it is not necessary to reduce a flow path area of any of the valve flow path 14, the second port P2, and the third port P3, and there is no inconvenience of reducing the flow rate or pressure in the fluid due to the pressure loss.

Since the rotary valve V includes the first buffer portion Sa, even when the direction of the flow of the fluid supplied through the first conduit portion M1 or the first external flow path L1 is not orthogonal to the wall surface of the wall portion 3 at the portion where the first port P1 is formed (a posture deviated from the radial direction around the rotation axis X), the rotary valve V supplies the fluid in the posture orthogonal to the wall surface of the wall portion 3 at the portion where the opening of the first port P1 is formed, thereby implementing the reduction of the flow path resistance.

As described above, in the configuration including the first buffer portion Sa, the posture of the first conduit portion M1 or the first external flow path L1 can be determined without considering the direction in which the fluid is supplied to the first port P1, and the rotary valve V can be easily designed.

Further, since the second buffer portion Sb is provided, even in the posture in which the fluid is not orthogonal to the wall surface of the wall portion 3 at the portion where the fourth port P4 is formed (a posture deviated from the radial direction around the rotation axis X) when the fluid is sent out from the fourth port P4, the fluid is sent out in a posture in which the fluid is orthogonal to the wall surface of the wall portion 3 at the portion where the opening of the fourth port P4 is formed, and the reduction of the flow path resistance is implemented.

Regardless of whether the valve rotor R is at the first rotation position Q1 or the second rotation position Q2, the fluid from the fifth conduit portion M5 at the start end of the fourth external flow path L5 is controlled by the opening portion 15 formed by the pair of control surfaces 15a recessed in the direction of the rotation axis X in the valve rotor R, and can be sent out from the fourth conduit portion M4 from the terminal end position of the fourth external flow path L4.

As shown in the modification, by setting the first conduit portion M1, the fourth conduit portion M4, and the fifth conduit portion M5 in the posture parallel to one another, hoses and the like connected thereto can be easily handled.

The first conduit portion M1, the fourth conduit portion M4, and the fifth conduit portion M5 are set in the parallel posture as described above, and the first buffer portion Sa, the second buffer portion Sb, and the third buffer portion Sc are provided corresponding to the first conduit portion M1, the fourth conduit portion M4, and the fifth conduit portion M5. Therefore, a phenomenon that the fluid flowing through the first port P1, the fourth port P4, and the fifth port P5 flows in a state of being bent at a steep angle is eliminated, and the increase in the flow path resistance is prevented.

Other Embodiments

Embodiments disclosed here may be implemented as follows in addition to the embodiment described above (those having the same functions as those in the embodiment are denoted by the same reference numerals and signs as those in the embodiment).

Figure 11:
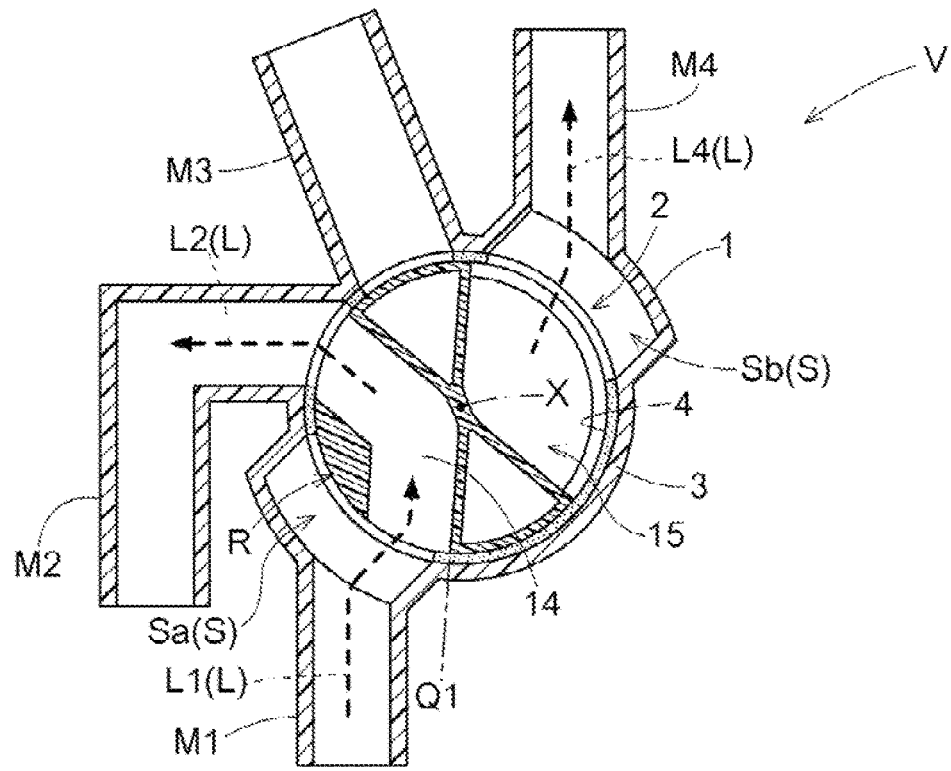
FIG. 11 is a cross-sectional view of a valve housing in which a first port and a second port according to another embodiment (a) communicate with each other.
Figure 12:
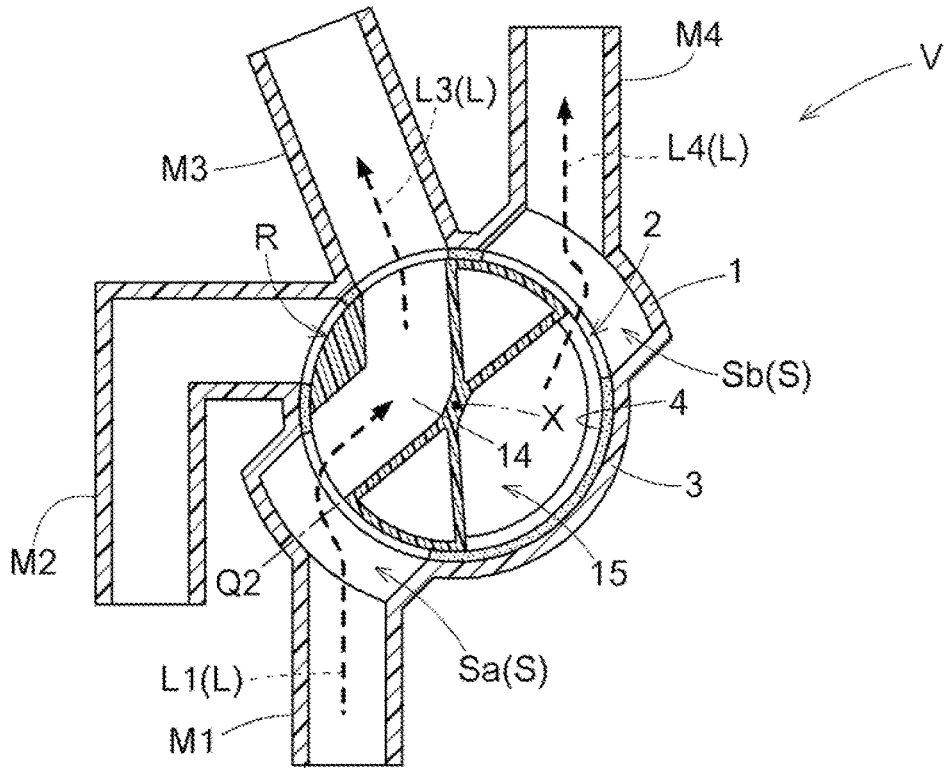
FIG. 12 is a cross-sectional view of the valve housing in which the first port and a third port according to the another embodiment (a) communicate with each other.

(a) As shown in FIGS. 11 and 12, the valve rotor R is accommodated in the valve chamber 2 of the valve housing 1 so as to be rotatable about the rotation axis X, the first port P1, the second port P2, the third port P3, and the fourth port P4 are formed in the wall portion 3 of the valve chamber 2, and the valve housing 1 is provided with the first conduit portion M1, the second conduit portion M2, the third conduit portion M3, and the fourth conduit portion M4.

Although not shown in the drawings, another embodiment (a) includes the valve rotor R (see FIGS. 4 and 5) having a configuration common to that described in the embodiment. Similarly to the embodiment, the communication space 7 (see FIG. 6) having a smaller diameter than the valve chamber 2 and having a bottom and having the rotation axis X as a center is formed at a position overlapping the valve chamber 2 when viewed in a direction along the rotation axis X.

In the another embodiment (a), by setting the valve rotor R to the first rotation position Q1 and the second rotation position Q2, a fluid from the first port P1 is sent out to the second port P2 and the third port P3 by switching therebetween, and the communication space 7 is implemented to communicate with the fourth port P4 via the opening portion 15 of the valve rotor R.

In the configuration of the another embodiment (a), postures of the first conduit portion M1, the second conduit portion M2, the third conduit portion M3, and the fourth conduit portion M4 are different from those in the embodiment. That is, the first conduit portion M1, the second conduit portion M2, and the fourth conduit portion M4 are parallel to one another and openings of the first conduit portion M1 and the second conduit portion M2 are formed in the same direction, while an opening of the fourth conduit portion M4 is formed in an opposite direction. Further, a posture of the third conduit portion M3 is set in a direction extending in the radial direction around the rotation axis X. The first conduit portion M1, the second conduit portion M2, and the fourth conduit portion M4 are not limited to the parallel posture, and may be formed in a non-parallel positional relationship.

Even when the postures of the plurality of conduit portions M are set in this manner, the flow of the fluid is controlled while preventing pressure loss.

Figure 13:
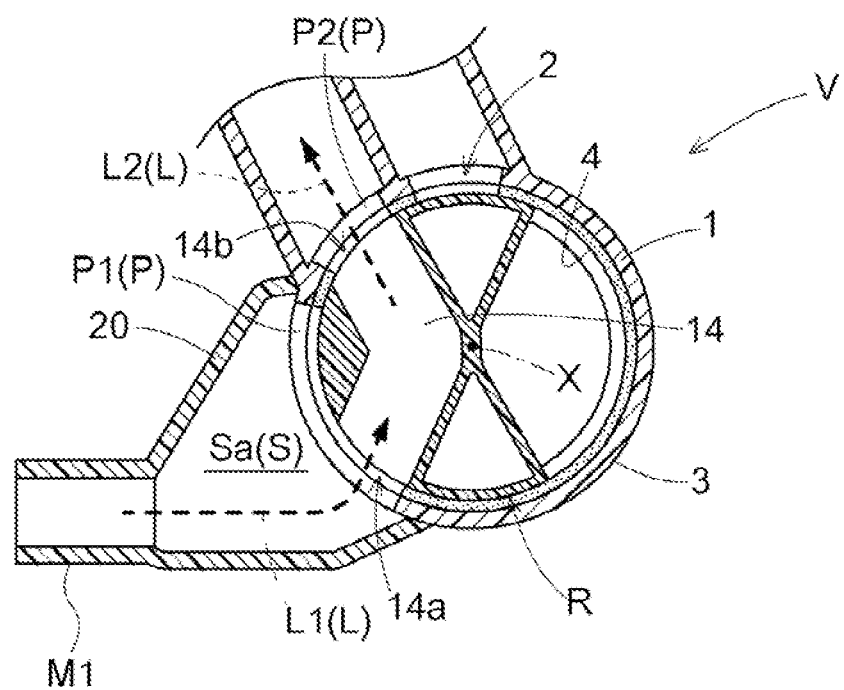
FIG. 13 is a cross-sectional view showing a first buffer portion according to another embodiment (b).

(b) As shown in FIG. 13, the first buffer portion Sa (an example of the buffer portion S) is formed by an enlarged region 20 in which a flow path cross-sectional area is enlarged toward a region closer to the wall portion 3 in the external flow paths L communicating with the ports P. In another embodiment (b), the enlarged region 20 is integrally formed at end portions of the external flow paths L, and the external flow paths L are attached to the outside of the wall portion 3 so that the enlarged region 20 thus formed is disposed at a position covering the first port P1.

In the another embodiment (b), the second buffer portion Sb (an example of the buffer portion S) can be implemented in the same manner as the configuration shown in FIG. 13.

In particular, when the external flow path L is formed of resin, the enlarged region 20 may be integrally formed at the time of forming the external flow path L, and it is also possible to form the enlarged region 20 by attaching, to an end portion of the external flow path L having a predetermined inner diameter, a member whose flow path cross-sectional area increases toward a region closer to the wall portion 3.

(c) As described in the embodiment, the opening portion 15 is formed in the valve rotor R, and the lower wall 12 is formed in a circular shape in which a part thereof is missing. Alternatively, a strip-shaped member having an arc shape centered on the rotation axis X may be provided in a region in which a part of the lower wall 12 is missing.

By providing the strip-shaped member in this manner, when the valve rotor R is accommodated in the cylindrical wall portion 3 of the valve chamber 2, the arc-shaped strip-shaped member comes into contact with an inner wall of the wall portion 3, so that the valve rotor R can be stably rotated.

(d) A shape of the valve flow path 14 formed in the valve rotor R is not limited to the bent shape shown in the embodiment, and may be a linear shape or a curved shape. The valve rotor R may be formed with a plurality of valve flow paths 14.

(e) The rotary valve V may have five or more ports P.

(f) In the embodiment, the modification, and another embodiments, the port P at a specific position among the plurality of ports P formed as openings with respect to the wall portion 3 is determined as the first port P1, and other ports P are determined as the second port P2, the third port P3, and the fourth port P4 with reference to the first port P1, whereas the positional relationship among the ports P is not limited to that shown in the drawings, and the ports P may be disposed in any positional relationship.

The plurality of external flow paths L (the first external flow path L1, the second external flow path L2, the third external flow path L3, and the fourth external flow path L4) corresponding to the corresponding ports P among the positions of the external flow paths L related to the ports P can also be disposed at any positions. Further, the arrangement of the external flow paths L with respect to the valve housing 1 can also be optionally set.

In another embodiment (f), a flow direction of a fluid may be opposite to the direction described in the embodiment. Similarly, a flow of the fluid between the fourth port P4 and the fifth port P5 may be in a direction opposite to that described in the embodiment.

Embodiments discloses here can be applied to a rotary valve in which a valve rotor is accommodated in a valve chamber and a plurality of ports are formed in a cylindrical wall portion of the valve chamber.

A characteristic configuration according to this disclosure includes: a valve chamber in which at least three ports including at least a first port, a second port, and a third port are disposed in this order as openings arranged in a circumferential direction in a cylindrical wall portion centered on a rotation axis; at least three external flow paths disposed outside the valve chamber and communicating with the at least three ports including the first port, the second port, and the third port, respectively; and a valve rotor accommodated in the valve chamber so as to be rotatable about the rotation axis and configured to switch a flow of a fluid between the plurality of ports by a rotation operation. The valve rotor includes a valve flow path that allows the fluid to flow between the first port and the second port in a state in which the valve rotor is set to a first rotation position, and the first port extends in the circumferential direction of the wall portion in accordance with a predetermined angle in order to allow the fluid to flow between the first port and the third port via the valve flow path in a state in which the valve rotor is set to a second rotation position in which the valve rotor is rotated by the predetermined angle from the first rotation position, and a first buffer portion is formed between the first port and the external flow path corresponding to the first port, the first buffer portion covering the entire first port and serving as a space having a circumferential width larger than a circumferential width of the valve flow path.

According to such a characteristic configuration, since the first port is formed in the region extending in the circumferential direction of the wall portion of the valve chamber, even when the valve rotor is switched from the first rotation position to the second rotation position, the fluid can be supplied from the first port to the valve flow path of the valve rotor. In the configuration, since it is not necessary to adopt a configuration in which the flow path area between the second port and the third port is reduced as in the port A or the port B disclosed in Reference 2, an increase in flow path resistance in the second port and the third port is not caused.

Further, since the first buffer portion that covers the first port in the wall portion and serves as a space having a circumferential width larger than a circumferential width of the valve flow path is formed, and the fluid in the external flow path flows to the first buffer portion, for example, even if the external flow path is disposed in a posture along a tangent line of the wall portion with respect to the first port, the fluid flowing between the external flow path and the first port flows in a posture orthogonal to an opening of the first port (a posture along a virtual straight line passing through a center of the valve chamber) inside the first buffer portion, inconvenience of the flow path being bent at a steep angle can be eliminated, and an increase in the flow path resistance at this portion can be prevented.

Therefore, the rotary valve is configured to control the fluid flowing through the ports by rotation of the valve rotor, and to send out the fluid in a state where the flow path resistance at the ports is reduced.

As a configuration added to the above configuration, the first buffer portion may be a space having an outer wall surface protruding outward from an outer surface of the wall portion.

Accordingly, the first buffer portion can be formed so as to protrude to the outside of the wall portion of the valve chamber outside the first port. Since the first buffer portion has a structure protruding to the outside of the wall portion of the valve chamber, even when the external flow path through which the fluid flows is disposed between the first port and the first buffer portion, it is possible to randomly set an angle at which the external flow path is connected to the outer wall portion.

As a configuration added to the above configuration, the first buffer portion may be an enlarged region in which a flow path cross-sectional area is enlarged as the first buffer portion comes closer to the wall portion.

Accordingly, by forming the external flow path such that the flow path cross-sectional area increases toward a region closer to the wall portion in the external flow path, the first buffer portion communicating with the first port can be formed without adopting a configuration in which a member is added to the outside of the valve chamber. In addition, in the configuration, it is only necessary to change a structure of an end portion of the external flow path, and it is possible to prevent complication of the configuration.

As a configuration added to the above configuration, the outer wall surface of the first buffer portion may be reduced in diameter to finally form a flow path connected to the external flow path.

As a configuration added to the above configuration, a flow path cross-sectional area of the valve flow path may be larger than a flow path cross-sectional area of a boundary between the first buffer portion and the first port.

Accordingly, the flow path resistance in the valve flow path of the valve rotor can be made smaller than the flow path resistance acting on the fluid at the boundary between the first port and the valve flow path, and a favorable flow of the fluid is produced without causing a reduction in the flow rate.

As a configuration added to the above configuration, the valve chamber may further include a fourth port and a fifth port in this order in addition to the first port, the second port, and the third port, and the valve rotor may include a communication flow path that allows the fourth port and the fifth port to communicate with each other regardless of whether the valve rotor is in the first rotation position or the second rotation position.

Accordingly, it is possible to control the flow of the fluid in the first port, the second port, and the third port by setting the rotation position of the valve rotor while maintaining a state in which the fluid flows through the communication flow path between the fourth port and the fifth port.

As a configuration added to the above configuration, a buffer portion may be formed between at least one of the fourth port and the fifth port and the external flow path corresponding to the port, the buffer portion covering the entire port.

Accordingly, since the fluid from at least one of the fourth port and the fifth port communicates with the external flow path via the buffer portion, for example, even when the external flow path is disposed in a posture along a tangent line of the wall portion, the fluid flowing between the fourth port, the fifth port, and the external flow path flows in a posture orthogonal to an opening of the port inside the buffer portion (a posture along a virtual straight line passing through a center of the valve chamber), the inconvenience of the flow path being bent at a steep angle can be eliminated, and an increase in flow path resistance at this portion can be prevented.

As a configuration added to the above configuration, the communication flow path of the valve rotor may be formed by a control surface recessed in a direction of the rotation axis inside the wall portion of the valve chamber.

Accordingly, for example, even if a flow path having a structure penetrating the valve rotor is not formed, the flow of the fluid can be controlled by the control surface formed in the valve rotor.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A rotary valve comprising:
a valve chamber in which at least three ports including at least a first port, a second port, and a third port are disposed in this order as openings arranged in a circumferential direction in a cylindrical wall portion centered on a rotation axis;
at least three external flow paths disposed outside the valve chamber and communicating with the at least three ports including the first port, the second port, and the third port, respectively; and
a valve rotor accommodated in the valve chamber so as to be rotatable about the rotation axis and configured to switch a flow of a fluid between the plurality of ports by a rotation operation, wherein
the valve rotor includes a valve flow path that allows the fluid to flow between the first port and the second port in a state in which the valve rotor is set to a first rotation position, and the first port extends in the circumferential direction of the wall portion in accordance with a predetermined angle in order to allow the fluid to flow between the first port and the third port via the valve flow path in a state in which the valve rotor is set to a second rotation position in which the valve rotor is rotated by the predetermined angle from the first rotation position,
a first buffer portion is formed between the first port and the external flow path corresponding to the first port, the first buffer portion covering the entire first port,
the valve chamber further includes a fourth port and a fifth port, one of the fourth port or the fifth port being open in the circumferential direction, and an other of the fourth port or the fifth port being open in an axial direction of the valve and in communication with a space adjacent to a bottom of the valve in the axial direction,
the valve rotor includes a communication flow path that allows the fourth port and the fifth port to communicate with each other regardless of whether the valve rotor is in the first rotation position or the second rotation position.

2. The rotary valve according to claim 1, wherein the first buffer portion is a space having an outer wall surface protruding outward from an outer surface of the wall portion.

3. The rotary valve according to claim 1, wherein the first buffer portion is an enlarged region in which a flow path cross-sectional area is enlarged as the first buffer portion comes closer to the wall portion.

4. The rotary valve according to claim 2, wherein the outer wall surface of the first buffer portion is reduced in diameter to finally form a flow path connected to the external flow path.

5. The rotary valve according to claim 1, wherein a flow path cross-sectional area of the valve flow path is larger than a flow path cross-sectional area of a boundary between the first buffer portion and the first port.

6. The rotary valve according to claim 1, wherein the communication flow path of the valve rotor is formed by a control surface recessed in a direction of the rotation axis inside the wall portion of the valve chamber.

* * * * *